(12) United States Patent
Uraoka et al.

(10) Patent No.: US 11,518,355 B2
(45) Date of Patent: Dec. 6, 2022

(54) BRAKE CONTROL DEVICE

(71) Applicant: ADVICS CO., LTD., Kariya (JP)

(72) Inventors: Terushige Uraoka, Takahama (JP); Keita Nakano, Hamamatsu (JP)

(73) Assignee: ADVICS CO., LTD., Kariya (JP)

( * ) Notice: Subject to any disclaimer, the term of this patent is extended or adjusted under 35 U.S.C. 154(b) by 426 days.

(21) Appl. No.: 16/634,231

(22) PCT Filed: Aug. 31, 2018

(86) PCT No.: PCT/JP2018/032280
§ 371 (c)(1),
(2) Date: Jan. 27, 2020

(87) PCT Pub. No.: WO2019/045026
PCT Pub. Date: Mar. 7, 2019

(65) Prior Publication Data
US 2021/0094521 A1 Apr. 1, 2021

(30) Foreign Application Priority Data
Aug. 31, 2017 (JP) .............................. JP2017-167537

(51) Int. Cl.
*B60T 8/88* (2006.01)
*B60T 13/66* (2006.01)

(52) U.S. Cl.
CPC .............. *B60T 8/885* (2013.01); *B60T 13/66* (2013.01); *B60T 2270/40* (2013.01)

(58) Field of Classification Search
CPC ....... B60T 8/885; B60T 13/66; B60T 2270/40
See application file for complete search history.

(56) References Cited

U.S. PATENT DOCUMENTS 6,629,026 B1* 9/2003 Baraszu .................. B60K 6/48
701/67
2001/0038240 A1* 11/2001 Yoshida ................ B60T 8/3275
303/28

(Continued)

FOREIGN PATENT DOCUMENTS

| JP | 2015047945 A | 3/2015 |
| JP | 2016068940 A | 5/2016 |
| WO | 2014184841 A1 | 11/2014 |

OTHER PUBLICATIONS

International Search Report (PCT/ISA/210) and translation and Written Opinion (PCT/ISA/237) dated Nov. 20, 2018, by the Japanese Patent Office as the International Searching Authority for International Application No. PCT/JP2018/032280.

*Primary Examiner* — Hussein Elchanti
(74) *Attorney, Agent, or Firm* — Buchanan Ingersoll & Rooney PC

(57) ABSTRACT

A brake control device for controlling an electric parking brake may include: a piston capable of pressing a brake pad in accordance with the hydraulic pressure in a cylinder; a linearly moving member that adjusts, by reciprocating in the cylinder, the pressing force applied to the brake pad by the piston; and an actuator that moves the linearly moving member by operating based on a target pressing force, which is a target value of the pressing force corresponding to an output value obtained from a sensor that detects information correlating with the hydraulic pressure. The brake control device is provided with: an abnormality detection unit that detects an abnormality of the sensor; and an actuator control unit that, if an abnormality is detected, controls the operation level of the actuator based on an output value obtained prior to the detection of the abnormality.

3 Claims, 5 Drawing Sheets

(56) References Cited

U.S. PATENT DOCUMENTS

| | | | |
|---|---|---|---|
| 2003/0183431 A1* | 10/2003 | Cikanek | B60W 20/10 |
| | | | 180/65.6 |
| 2004/0207257 A1* | 10/2004 | Faye | B60T 7/12 |
| | | | 303/125 |
| 2006/0004509 A1* | 1/2006 | Teslak | B60T 1/10 |
| | | | 701/84 |
| 2006/0258508 A1* | 11/2006 | Tanioka | B60R 25/04 |
| | | | 477/203 |
| 2008/0177434 A1* | 7/2008 | Moran | B60L 7/14 |
| | | | 701/22 |
| 2009/0115247 A1* | 5/2009 | Leiber | B60T 8/5075 |
| | | | 303/154 |
| 2013/0249274 A1* | 9/2013 | Miyazaki | B60T 7/042 |
| | | | 303/6.01 |
| 2015/0061365 A1* | 3/2015 | Sakashita | B60T 13/741 |
| | | | 303/15 |
| 2016/0090071 A1 | 3/2016 | Tuhro et al. | |
| 2016/0167631 A1* | 6/2016 | Miyazaki | B60T 8/17 |
| | | | 701/70 |
| 2017/0183087 A1* | 6/2017 | Georgin | B64C 25/46 |
| 2017/0369047 A1* | 12/2017 | Okada | B60T 17/18 |
| 2018/0029576 A1* | 2/2018 | Kobayashi | B60T 8/94 |
| 2018/0162339 A1* | 6/2018 | Irwan | B60T 8/00 |
| 2018/0244254 A1* | 8/2018 | Okano | B60T 8/17 |
| 2019/0315322 A1* | 10/2019 | Goto | B60T 8/171 |

* cited by examiner

BRAKE CONTROL DEVICE

TECHNICAL FIELD

Embodiments of the present invention relate to a brake control device.

BACKGROUND ART

Conventionally, a vehicle including a service brake and an electric parking brake is known.

A general electric parking brake is configured to generate a braking force for parking separate from a braking force by hydraulic pressure according to the operation of a service brake by pushing a piston capable of pressing a brake pad according to hydraulic pressure in a cylinder using a linearly moving member that is driven by an actuator such as a motor.

CITATION LIST

Patent Literature

PTL 1: JP-A-2016-68940

SUMMARY OF INVENTION

Technical Problem

In the conventional configuration as described above, when the electric parking brakes operates in a state where the magnitude of the hydraulic pressure in the cylinder generated by the service brake is equal to or greater than a predetermined level, the position of the linearly moving member is fixed in a state where the piston is pushed more than necessary, and an excessive load may be generated in the mechanism of the electric parking brake.

Therefore, in the conventional configuration as described above, in some cases, a technique for detecting the hydraulic pressure (or information correlating with the hydraulic pressure) in the cylinder by a sensor at the time of operation of the electric parking brake and setting a target value (target current value) to be applied to the actuator in consideration of the output value of the sensor is used.

However, in the configuration using the sensor as descried above, when an abnormality occurs in the sensor at the time of operation of the electric parking brake, the target value to be applied to the actuator cannot be set appropriately, and there is a possibility that an appropriate braking force without excess or deficiency cannot be obtained.

Thus, one of the objects of the embodiment is to provide a brake control device capable of obtaining an appropriate braking force without excess or deficiency even when an abnormality occurs in a sensor at the time of operation of an electric parking brake.

Solution to Problem

A brake control device according to the embodiment is a brake control device for controlling an electric parking brake provided with a piston that is capable of pressing a brake pad in accordance with the hydraulic pressure in a cylinder, a linearly moving member that adjusts, by reciprocating in the cylinder, a pressing force applied to the brake pad by the piston, and an actuator that moves the linearly moving member by operating on the basis of a target pressing force, which is a target value of the pressing force corresponding to an output value obtained from a sensor that detects information correlating with the hydraulic pressure. The brake control device includes an abnormality detection unit that detects an abnormality of the sensor; and an actuator control unit that, if the abnormality is detected, controls the operation level of the actuator on the basis of the output value prior to the detection of the abnormality. In this way, even when an abnormality occurs in the sensor at the time of operation of the electric parking brake, the target pressing force can be appropriately set on the basis of the past output value of the normal sensor. As a result, an appropriate braking force without excess or deficiency can be obtained even when an abnormality occurs in the sensor at the time of operation of the electric parking brake.

DESCRIPTION OF EMBODIMENTS

Hereinafter, an embodiment of the invention will be described with reference to the drawings. The configuration of the embodiment described below, and the operations and results (effect) obtained by the configuration are merely examples and are not limited to the following description.

First, the configuration of the embodiment will be described.

Figure 1:
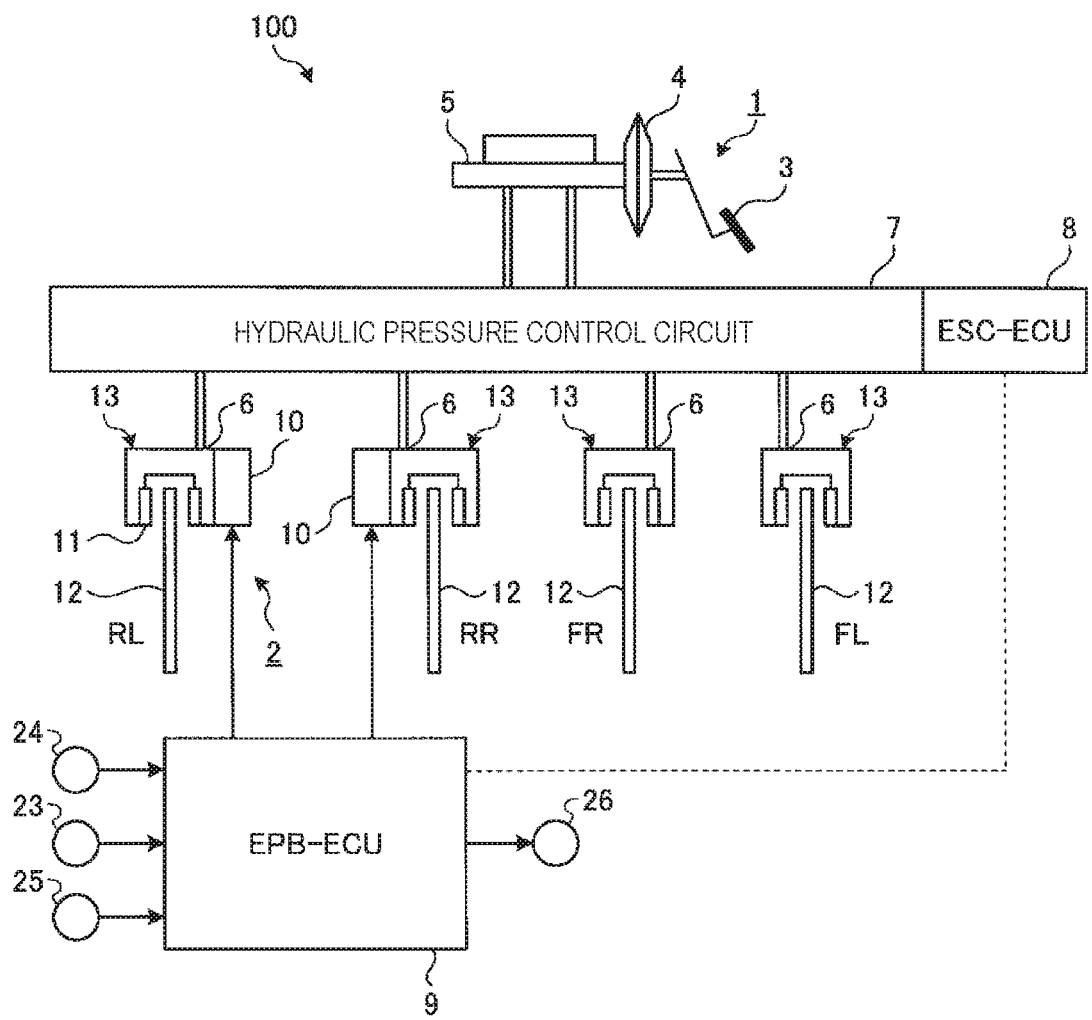
FIG. 1 is an exemplary block diagram showing a schematic configuration of a vehicle according to an embodiment.

FIG. 1 is an exemplary block diagram showing a schematic configuration of a vehicle 100 according to the embodiment. In the following, as an example, an example in which the technique of the embodiment is applied to the vehicle 100 as a four-wheel automobile having front wheels FL and FR and rear wheels RL and RR will be described. Further, in the following, the front wheels FL and FR and the rear wheels RL and RR may be simply referred to as wheels when there is no need to distinguish them.

As shown in FIG. 1, the vehicle 100 according to the embodiment has two types of brake mechanisms, that is, a service brake 1 that generates a braking force in response to a driver's depressing operation on a brake pedal 3, and an electric parking brake 2 that generates a braking force separately from the service brake 1 in response to a driver's operation on an EPB (Electric Parking Brake) switch 23.

In the example shown in FIG. 1, the service brake 1 is configured to apply a braking force to both the front wheels FL and FR and the rear wheels RL and RR, and the electric parking brake 2 is configured to apply a braking force only to the rear wheels RL and RR. Meanwhile, although details will be described later, both the service brake 1 and the electric parking brake 2 have a structure in which a braking force by a frictional force is applied to the wheels by pressing a brake pad 11 against a brake disc 12 that rotates together with the wheels.

More specifically, the service brake 1 is configured such that a braking force by a hydraulic pressure is applied to each wheel by generating a hydraulic pressure in a master cylinder 5 based on a driver's depression on the brake pedal 3 and transmitting the hydraulic pressure in the master cylinder 5 to wheel cylinders 6 provided in the wheels. Meanwhile, in the example shown in FIG. 1, the depressing force on the brake pedal 3 is amplified by a brake booster 4, so that a hydraulic pressure corresponding to the depressing force amplified by the brake booster 4 is generated in the master cylinder 5.

Further, in the example shown in FIG. 1, a hydraulic pressure control circuit 7 is provided between the master cylinder 5 and the wheel cylinder 6. The hydraulic pressure control circuit 7 includes a solenoid valve and a pump and the like and implements various controls such as ESC (Electronic Stability Control) for improving the safety of the vehicle 100, such as adjustment of a braking force by the service brake 1. Further, the hydraulic pressure control circuit 7 is driven on the basis of the control of an ESC-ECU (Electronic Control Unit) 8.

On the other hand, the electric parking brake 2 applies a braking force separate from the braking force by the service brake 1 to the rear wheels RL and RR by driving EPB motors 10 provided in calipers 13 on the basis of the control of an EPB-ECU 9. Therefore, in the example shown in FIG. 1, as will be described later, both the braking force by the service brake 1 and the braking force by the electric parking brake 2 can be applied to the rear wheels RL and RR.

Figure 2:
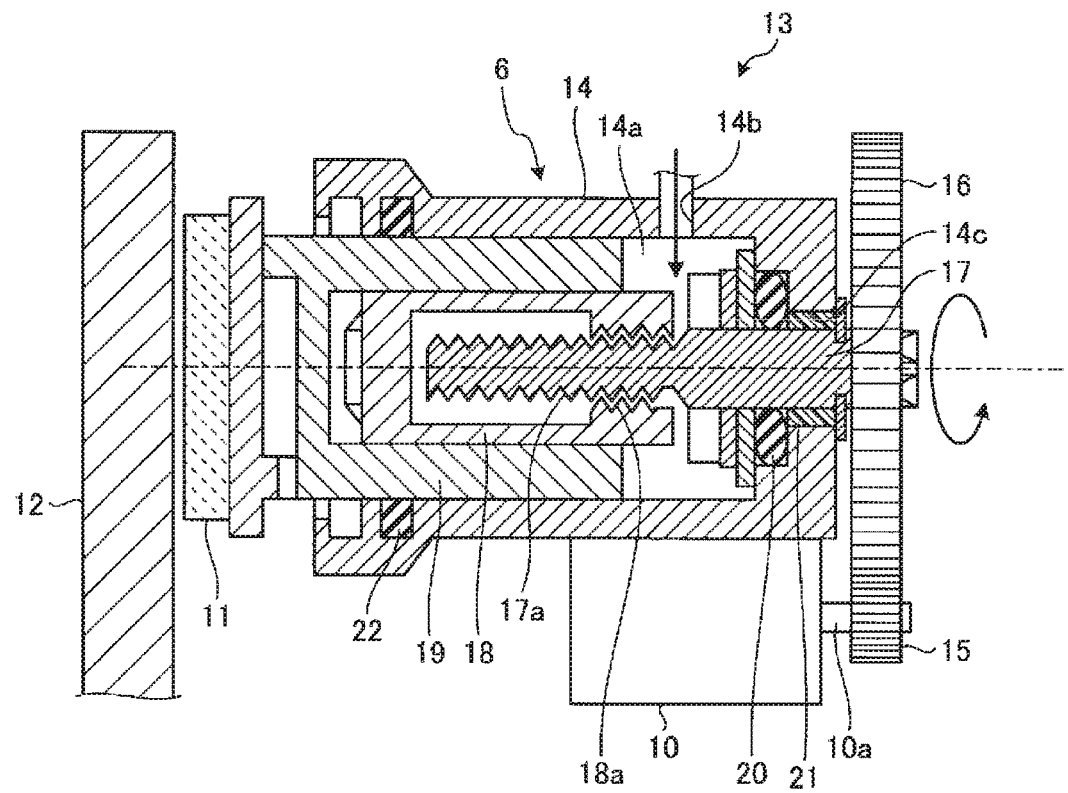
FIG. 2 is an exemplary sectional view showing a configuration of a brake mechanism provided on a rear wheel of the vehicle according to the embodiment.

FIG. 2 is an exemplary sectional view showing a configuration of a brake mechanism provided in the rear wheels RL and RR of the vehicle 100 according to the embodiment. FIG. 2 shows a specific example of a structure inside the calipers 13 of the rear wheels RL and RR.

First, a mechanism in which a braking force is increased or decreased by the service brake 1 will be briefly described.

As shown in FIG. 2, in the embodiment, a body 14 of the wheel cylinder 6 is provided with a hole portion 14b for introducing brake fluid into a hollow portion 14a inside the body 14. A piston 19 capable of reciprocating along an inner peripheral surface of the body 14 is provided in the hollow portion 14a. The piston 19 has a bottomed cylindrical shape, and the brake pad 11 facing the brake disc 12 is provided at the bottom of the piston 19.

Here, a seal member 22 for suppressing brake fluid from leaking from between an outer peripheral surface of the piston 19 and the inner peripheral surface of the body 14 is provided inside the body 14 of the wheel cylinder 6. In this way, the hydraulic pressure generated in the hollow portion 14a is applied to an end surface of the piston 19 opposite to the brake pad 11.

With this structure, when the brake pedal 3 is depressed as an operation of the service brake 1, the hydraulic pressure by the brake fluid is generated in the hollow portion 14a and the piston 19 moves in a direction (left direction in FIG. 2) in which the brake pad 11 is pressed. Further, when the piston 19 moves in the direction in which the brake pad 11 is pressed, the brake pad 11 is brought into contact with and pressed against the brake disc 12, and a braking force by a frictional force is applied to the wheel corresponding to the brake disc 12.

On the contrary, when the depression on the brake pedal 3 is released as an operation of the service brake 1, the hydraulic pressure in the hollow portion 14a decreases and the piston 19 moves in a direction (right direction in FIG. 2) in which the pressing on the brake pad 11 is released. Further, when the piston 19 moves in the direction in which the pressing on the brake pad 11 is released, the pressing force of the brake pad 11 against the brake disc 12 is weakened and the braking force to be applied to the wheel corresponding to the brake disc 12 is reduced. Meanwhile, when the brake pad 11 is completely separated from the brake disc 12, the braking force to be applied to the brake disc 12 becomes zero.

Subsequently, a mechanism in which a braking force is increased or decreased by the electric parking brake 2 will be briefly described.

As shown in FIG. 2, in the embodiment, the EPB motor 10 is fixed to the body 14 of the wheel cylinder 6. A spur gear 15 is connected to a drive shaft 10a of the EPB motor 10. In this way, when the EPB motor 10 is driven and the drive shaft 10a rotates, the spur gear 15 also rotates with the drive shaft 10a as the center of rotation.

Further, a spur gear 16 having a rotation shaft 17 is meshed with the spur gear 15. The rotation shaft 17 is located at the center of rotation of the spur gear 16. The rotation shaft 17 is supported by an O-ring 20 and a bearing 21 provided in an insertion hole 14c in a state of being inserted into the insertion hole 14c of the body 14 of the wheel cylinder 6.

Here, a male thread groove 17a is formed on an outer peripheral surface of an end portion of the rotation shaft 17 opposite to the spur gear 16. The male thread groove 17a is screwed with a female thread groove 18a provided on an inner peripheral surface of a bottomed cylindrical linearly moving member 18 reciprocating inside the piston 19. In this way, when the spur gear 15 is rotated by driving the EPB motor 10, the rotation shaft 17 rotates together with the spur gear 16, and the linearly moving member 18 reciprocates in an axial direction of the rotation shaft 17 by the engagement of the male thread groove 17a and the female thread groove 18a.

Meanwhile, the linearly moving member 18 has a detent structure in relation to the rotation shaft 17. Thus, the linearly moving member 18 has a structure that does not rotate together with the rotation shaft 17 even when the rotation shaft 17 rotates. Similarly, the piston 19 has a detent structure in relation to the linearly moving member 18. Thus, the piston 19 has a structure that does not rotate together with the linearly moving member 18 even when the linearly moving member 18 rotates around the rotation shaft 17.

In this manner, in the embodiment, a motion conversion mechanism that converts the rotation of the EPB motor 10 into the reciprocating movement of the linearly moving member 18 inside the piston 19 is provided. Meanwhile, the linearly moving member 18 is adapted to stop at the same position by a frictional force caused by the engagement of the male thread groove 17a and the female thread groove 18a when the driving of the EPB motor 10 is stopped.

With the structure as described above, when the EPB motor 10 rotates in a forward direction at the time of operation of the electric parking brake 2, the linearly moving member 18 moves in a direction (left direction in FIG. 2) in which it comes into contact with the piston 19. Further, the piston 19 is supported by the linearly moving member 18 when the linearly moving member 18 and the piston 19 come into contact with each other in a state where the brake pad 11 is pressed against the brake disc 12. Therefore, the braking force to be applied to the wheels is maintained (locked), for example, even when the depression on the brake pedal 3 (see FIG. 1) is released and the hydraulic pressure in the hollow portion 14a decreases.

On the contrary, when the EPB motor 10 rotates in a reverse direction, the linearly moving member 18 moves in a direction (right direction in FIG. 2) away from the piston 19. Further, when the linearly moving member 18 moves away from the piston 19, the pressing of the brake pad 11 against the brake disc 12 by the piston 19 is accordingly weakened, and the braking force to be applied to the wheels is released.

In this manner, in the embodiment, the brake mechanisms provided on the rear wheels RL and RR are shared by the service brake 1 and the electric parking brake 2.

Referring back to FIG. 1, the ESC-ECU 8 has computer resources such as a processor and a memory. The ESC-ECU 8 implements various functions for controlling the hydraulic pressure control circuit 7 by executing a program stored in a memory or the like by a processor. The ESC-ECU 8 is communicably connected to the EPB-ECU 9 via an in-vehicle network or the like.

Further, similarly to the ESC-ECU 8, the EPB-ECU 9 also has computer resources such as a processor and a memory. The EPB-ECU 9 implements various functions for controlling the EPB motor 10 by executing a program stored in a memory or the like by a processor.

In the embodiment, the EPB-ECU 9 is configured to acquire information such as a signal corresponding to an operation state (ON/OFF) of the EPB switch 23, a detection value of a longitudinal acceleration sensor 24 that detects longitudinal acceleration of the vehicle 100, and a detection value of a hydraulic pressure sensor 25 that detects hydraulic pressure in the master cylinder 5, and to be able to use the acquired information for controlling the EPB motor 10.

Here, in the embodiment, the hydraulic pressure sensor 25 has a self-diagnosis function. That is, in the embodiment, the hydraulic pressure sensor 25 is configured to output a signal (abnormality flag) for notifying abnormality when abnormality occurs in itself.

Further, in the embodiment, the EPB-ECU 9 is configured to determine the abnormality of the hydraulic pressure sensor 25 on the basis of the abnormality flag acquired from the hydraulic pressure sensor 25 and to be able to control an abnormality notification lamp 26 for notifying the abnormality of the hydraulic pressure sensor 25 (and other sensors) based on the determination result.

Meanwhile, the abnormality flag acquired from the hydraulic pressure sensor 25 is likely to be confused with noise or the like. Therefore, in the embodiment, only when the abnormality flag is acquired from the hydraulic pressure sensor 25 continuously for a predetermined time or more, the EPB-ECU 9 determines that the abnormality of the hydraulic pressure sensor 25 has definitely occurred, and turns on the abnormality notification lamp 26. That is, even when the abnormality flag is acquired from the hydraulic pressure sensor 25, the EPB-ECU 9 keeps the abnormality notification lamp 26 off until the abnormality flag is acquired continuously for a predetermined time or more.

By the way, in the brake mechanism as shown in FIG. 2 shared by the service brake 1 and the electric parking brake 2, when the braking force by the electric parking brake 2 is locked in a situation where the hydraulic pressure in the wheel cylinder 6 generated by the service brake 1 is greater than a normally assumed range, a situation occurs in which the position of the linearly moving member 18 is fixed in a state where the piston 19 is pushed more than necessary. Further, in this situation, when the hydraulic pressure by the service brake 1 is released, an excessive load exceeding a predetermined value is generated in the mechanism of the electric parking brake 2 such as the linearly moving member 18.

Therefore, conventionally, there has been proposed a technique for calculating the hydraulic pressure in the wheel cylinder 6 based on the output value of the hydraulic pressure sensor 25 at the time of operation of the electric parking brake 2 and setting (correcting) a target value (target current value) to be applied to the EPB motor 10 in accordance with the calculation result.

In the conventional technique as described above using the output value of the hydraulic pressure sensor 25, for example, the target current value to be applied to the EPB motor 10 is set smaller as the hydraulic pressure in the wheel cylinder 6 calculated on the basis of the output value is larger. In this way, the piston 19 is prevented from being pushed more than necessary by the linearly moving member 18. As a result, it is possible to prevent an excessive load from being generated in the mechanism of the electric parking brake 2 while ensuring the braking force necessary for stopping the vehicle 100 without excess or deficiency.

However, in the conventional technique as described above using the output value of the hydraulic pressure sensor 25, the target current value to be applied to the EPB motor 10 cannot be set appropriately when an abnormality occurs in the hydraulic pressure sensor 25 at the time of operation of the electric parking brake 2. Therefore, there is a possibility that an appropriate braking force without excess or deficiency cannot be obtained.

Thus, the EPB-ECU 9 according to the embodiment executes a predetermined control program stored in a memory or the like by a processor and realizes a brake control device 300 having the following functions. In this way, the EPB-ECU 9 realizes obtaining an appropriate braking force without excess or deficiency even when an abnormality occurs in the hydraulic pressure sensor 25 at the time of operation of the electric parking brake 2.

Figure 3:
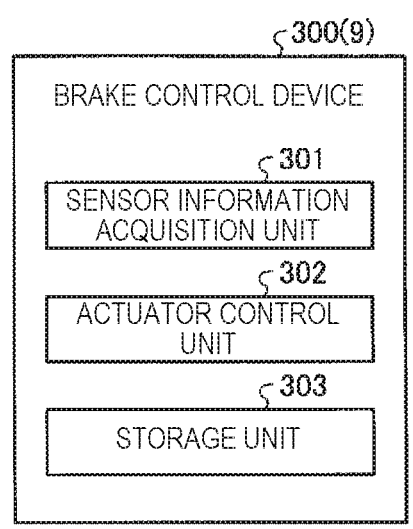
FIG. 3 is an exemplary block diagram showing a function of a brake control device according to the embodiment.

FIG. 3 is an exemplary block diagram showing the function of the brake control device 300 according to the embodiment. As shown in FIG. 3, the brake control device 300 according to the embodiment includes a sensor information acquisition unit 301, an actuator control unit 302, and a storage unit 303. Meanwhile, in the embodiment, some or all of the functions shown in FIG. 3 may be implemented by a dedicated hardware (circuit).

The sensor information acquisition unit 301 acquires output values of various sensors provided in the vehicle 100, such as the longitudinal acceleration sensor 24 and the hydraulic pressure sensor 25. From the output value of the longitudinal acceleration sensor 24, the gradient or the like of a road surface on which the vehicle 100 is located can be calculated. From the output value of the hydraulic pressure sensor 25, the hydraulic pressure generated in the wheel cylinder 6 according to the depressing operation on the brake pedal 3 can be calculated.

Meanwhile, in the embodiment, the sensor information acquisition unit 301 is configured to be able to acquire the above-described abnormality flag output from the hydraulic pressure sensor 25. Therefore, in the embodiment, the sensor information acquisition unit 301 functions as an abnormality detection unit for detecting an abnormality in the hydraulic pressure sensor 25. Further, in the embodiment, the sensor information acquisition unit 301 is configured to be able to store a past output value of the hydraulic pressure sensor 25 which is acquired before the abnormality flag is acquired.

The actuator control unit 302 controls the EPB motor 10. For example, the actuator control unit 302 can stop or rotate the EPB motor 10 in a forward direction or a reverse direction so as to control the position of the linearly moving member 18.

The storage unit 303 stores data used for various processes executed by the brake control device 300. For example, the storage unit 303 stores data indicating the corresponding relationship between the gradient of the road surface and the target current value to be applied to the EPB motor 10 according to the gradient, and data indicating the corresponding relationship between the output value of the hydraulic pressure sensor 25 and the current value to be subtracted from the target current value according to the output value.

In the embodiment, by referring to the data in the storage unit 303 based on the data acquired by the sensor information acquisition unit 301, the actuator control unit 302 sets the target current value to be applied to the EPB motor 10 to be smaller as the hydraulic pressure in the wheel cylinder 6 is larger, at the time of operation of the electric parking brake 2, and suppresses the piston 19 from being pushed more than necessary by the linearly moving member 18. In this way, it is possible to prevent an excessive load from being generated in the mechanism of the electric parking brake 2 while ensuring the braking force necessary for stopping the vehicle 100 without excess or deficiency.

By the way, the output value of the hydraulic pressure sensor 25 becomes unreliable when an abnormality occurs in the hydraulic pressure sensor 25. Therefore, in the case where an abnormality flag is acquired from the hydraulic pressure sensor 25, the target current value to be applied to the EPB motor 10 cannot be determined (set) appropriately even when referring to the data in the storage unit 303 based on the output value of the hydraulic pressure sensor 25 acquired thereafter, and excess or deficiency of the braking force may occur.

Thus, in the embodiment, when an abnormality is detected in the hydraulic pressure sensor 25 at the time of operation of the electric parking brake 2 (the EPB motor 10), the actuator control unit 302 sets the target current value to be applied to the EPB motor 10 based on the output value of the hydraulic pressure sensor 25 before the abnormality is detected. In this way, an appropriate target current value can be set on the basis of the output value of the hydraulic pressure sensor 25 in a normal state.

Meanwhile, in the embodiment, the output value of the hydraulic pressure sensor 25 used for setting the target current value may be acquired immediately before an abnormality is detected or may be acquired a certain time before the timing at which an abnormality is detected, so long as it is acquired from the hydraulic pressure sensor 25 in the normal state.

Here, in the embodiment, as described above, the abnormality flag acquired from the hydraulic pressure sensor 25 is likely to be confused with noise or the like. Therefore, even in a state where an abnormality flag is acquired at certain timing, it cannot be determined that the abnormality of the hydraulic pressure sensor 25 is definitely generated until the state continues for a predetermined time or more.

Further, in the embodiment, there is a time lag until the result of definite abnormality determination of the hydraulic pressure sensor 25 is obtained. Therefore, when the current value of the EPB motor 10 reaches the target current value and the braking force is locked before the result of definite abnormality determination of the hydraulic pressure sensor 25 is obtained, inconvenience may occur.

That is, in the embodiment, when the abnormality of the hydraulic pressure sensor 25 is definitely determined, it is necessary to set the target current value to be applied to the EPB motor 10 not to a value based on the output value of the hydraulic pressure sensor 25, but to a value necessary to ensure the minimum braking force determined by laws and regulations. Therefore, when the current value of the EPB motor 10 reaches the target current value before the result of definite abnormality determination of the hydraulic pressure sensor 25 is obtained, as a result, the target current value becomes an inappropriate value, and excess or deficiency of the braking force may occur.

Thus, in the embodiment, the actuator control unit 302 determines that an abnormality of the hydraulic pressure sensor 25 is definitely generated when the state in which an abnormality of the hydraulic pressure sensor 25 is detected (the state in which the hydraulic pressure sensor 25 outputs an abnormality flag) continues for a predetermined time. Further, when an abnormality is detected at the time of operation of the EPB motor 10, the actuator control unit 302 adjusts the driving speed (rotational speed) of the EPB motor 10 so that the current value of the EPB motor 10 reaches the target current value after a predetermined time has elapsed since the abnormality is detected.

More specifically, in the embodiment, the actuator control unit 302 calculates an estimated value of the time required for the current value of the EPB motor 10 to reach the present target current value when an abnormality is detected at the time of operation of the EPB motor 10. Then, the actuator control unit 302 reduces the driving speed of the EPB motor 10 when the estimated value is shorter than a predetermined time required for definite abnormality determination of the hydraulic pressure sensor 25. In this way, the timing at which the current value of the EPB motor 10 reaches the target current value can be delayed after the timing at which definite abnormality determination of the hydraulic pressure sensor 25 is performed.

For example, the actuator control unit 302 calculates an axial force speed as a speed at which an axial force generated by the linearly moving member 18 or the like changes in consideration of various parameters such as the voltage of the EPB motor 10 and the temperature of the brake pad 11. Further, the actuator control unit 302 calculates an estimated value of the time required for the current value of the EPB motor to reach the target current value by converting the difference between the (present) current value of the EPB motor 10 and the target current value into a distance and dividing the distance by the axial force speed.

Meanwhile, in the embodiment, in the case where the difference between the current value of the EPB motor 10 and the target current value at the time when an abnormality is detected is small, it is preferable to slow the increase rate of the current value of the EPB motor 10, as compared to the case where the difference is large. That is, in the embodiment, the degree of reduction in the driving speed of the EPB motor is preferably determined according to the difference between the current value of the EPB motor 10 and the target current value at the time when an abnormality is detected.

Therefore, in the embodiment, the actuator control unit 302 calculates the difference between the current value of the EPB motor 10 and the target current value at the timing when an abnormality is detected, and greatly reduces the driving speed as the difference is smaller.

Subsequently, the control operation of the embodiment will be described.

Figure 4:
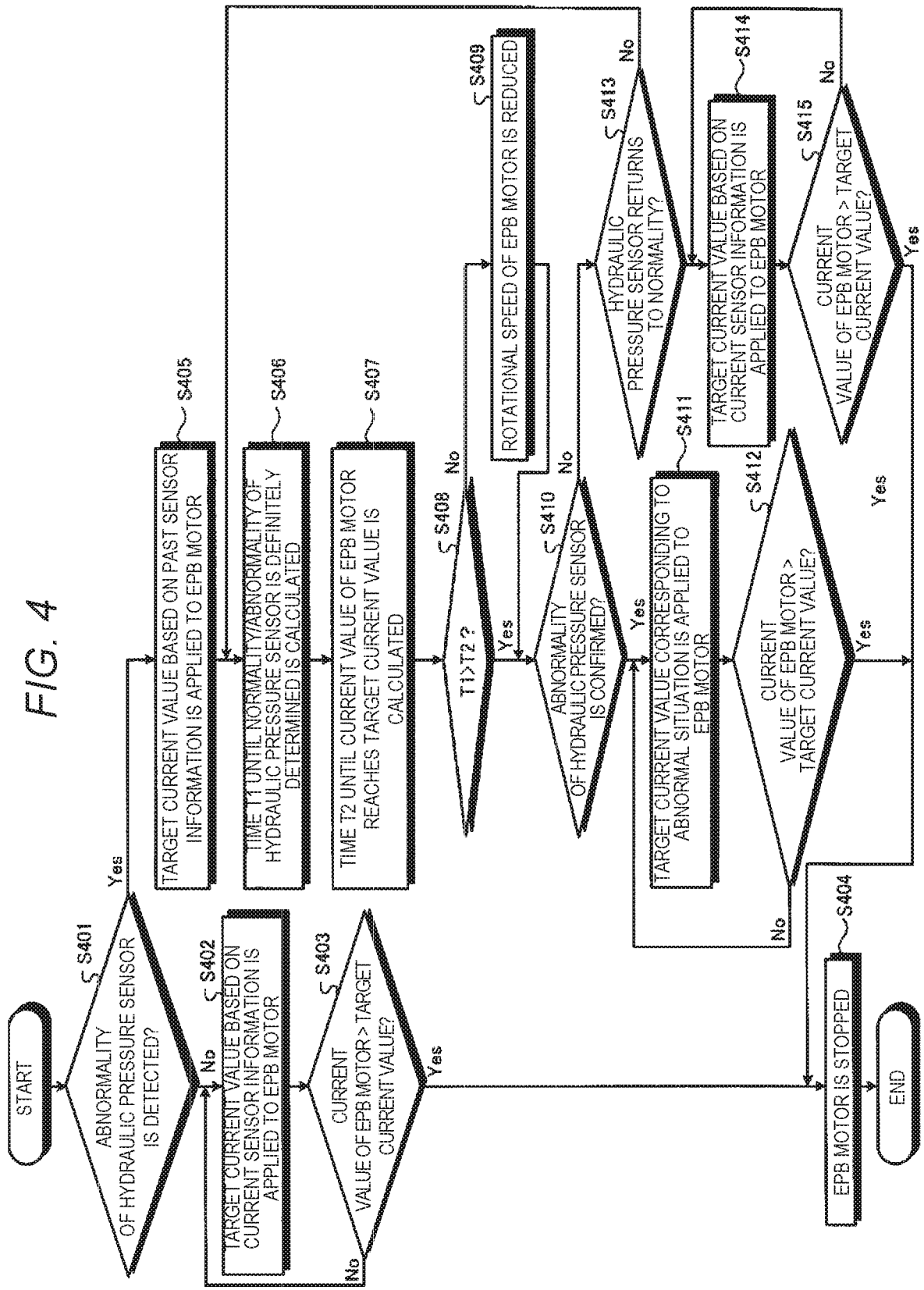
FIG. 4 is an exemplary flowchart showing a series of processes executed by the brake control device when an electric parking brake according to the embodiment is operated.

FIG. 4 is an exemplary flowchart showing a series of processes executed by the brake control device 300 when the electric parking brake 2 according to the embodiment is operated. For example, the processing flow shown in FIG. 4 starts when the operation of the EPB switch 23 by a driver is detected at the time of parking the vehicle 100.

As shown in FIG. 4, in the embodiment, first, in S401, the actuator control unit 302 determines whether or not an abnormality of the hydraulic pressure sensor 25 is detected, more specifically, whether or not the sensor information acquisition unit 301 acquires information that can be received as an abnormality flag from the hydraulic pressure sensor 25.

When it is determined in S401 that an abnormality of the hydraulic pressure sensor 25 is not detected, the process proceeds to S402. Then, in S402, the actuator control unit 302 applies, to the EPB motor 10, a target current value based on the present sensor information (the output value of the hydraulic pressure sensor 25) acquired by the sensor information acquisition unit 301 and drives the EPB motor 10.

Then, in S403, the actuator control unit 302 monitors the current value of the EPB motor 10 and determines whether or not the current value exceeds the target current value set in S402.

When it is determined in S403 that the current value of the EPB motor 10 does not exceed the target current value, it can be determined that the pushing of the piston 19 by the linearly moving member 18 is not yet sufficient. Therefore, in this case, the EPB motor 10 continues driving, and the process returns to S402.

Further, when it is determined in S403 that the current value of the EPB motor 10 exceeds the target current value, it can be determined that the pushing of the piston 19 by the linearly moving member 18 is already sufficient. Therefore, in this case, the process proceeds to S404. In S404, the actuator control unit 302 stops the EPB motor 10. Then, the process ends.

On the other hand, when it is determined in S401 that an abnormality of the hydraulic pressure sensor 25 is detected, the process proceeds to S405. Then, in S405, the actuator control unit 302 applies, to the EPB motor 10, the target current value based on the past sensor information, that is, the output value of the hydraulic pressure sensor 25 before an abnormality is detected.

Then, in S406, the actuator control unit 302 calculates the time (denoted as T1) from the present time until normality/abnormality of the hydraulic pressure sensor 25 is definitely determined.

Then, in S407, the actuator control unit 302 calculates the time (denoted as T2) from the present time until the current value of the EPB motor 10 reaches the target current value set in S405.

Then, in S408, the actuator control unit 302 determines whether or not the time T1 calculated in S406 is longer than the time T2 calculated in S407.

When it is determined in S408 that the time T1 calculated in S406 is shorter than the time T2 calculated in S407, the current value of the EPB motor 10 reaches the target current value before normality/abnormality of the hydraulic pressure sensor 25 is definitely determined, and thus, the inconvenience as described above may occur. Therefore, in this case, the process proceeds to the next S409.

In S409, the actuator control unit 302 reduces the driving speed (rotational speed) of the EPB motor 10. The degree of reduction in the driving speed is preferably determined according to, for example, the difference between the current value of the EPB motor 10 and the target current value at the time when an abnormality of the hydraulic pressure sensor 25 is detected. Then, the process proceeds to S410.

Meanwhile, when it is determined in S408 that the time T1 calculated in S406 is longer than the time T2 calculated in S407, even without adjusting the driving speed of the EPB motor 10, the current value of the EPB motor 10 does not reach the target current value before normality/abnormality of the hydraulic pressure sensor 25 is definitely determined. Therefore, in this case, the process as in S409 is not executed, and the process proceeds to S410.

In S410, the actuator control unit 302 determines whether or not an abnormality of the hydraulic pressure sensor 25 is confirmed, that is, whether or not the state in which the sensor information acquisition unit 301 acquires the abnormality flag from the hydraulic pressure sensor 25 continues for a predetermined time.

When it is determined in S410 that an abnormality of the hydraulic pressure sensor 25 is confirmed, the process proceeds to S411. Then, in S411, the actuator control unit 302 applies, to the EPB motor 10, the target current value corresponding to the abnormal situation, more specifically, the target current value necessary to ensure the minimum braking force determined by laws and regulations. In addition, the actuator control unit 302 notifies a driver or the like that an abnormality occurs in the hydraulic pressure sensor 25 by turning on the abnormality notification lamp 26.

Then, in S412, the actuator control unit 302 monitors the current value of the EPB motor 10 and determines whether or not the current value exceeds the target current value set in S411.

When it is determined in S412 that the current value of the EPB motor 10 does not exceed the target current value, it can be determined that the pushing of the piston 19 by the linearly moving member 18 is not yet sufficient. Therefore, in this case, the EPB motor 10 continues driving, and the process returns to S411.

Further, when it is determined in S412 that the current value of the EPB motor 10 exceeds the target current value, it can be determined that the driving of the piston 19 by the linearly moving member 18 is already sufficient. Therefore, in this case, the process proceeds to S404. In S404, the actuator control unit 302 stops the EPB motor 10. Then, the process ends.

On the other hand, when it is determined in S410 that an abnormality of the hydraulic pressure sensor 25 is not confirmed, the process proceeds to S413. Then, in S413, the actuator control unit 302 determines whether or not the hydraulic pressure sensor 25 returns to a normal state, that is, whether or not the sensor information acquisition unit 301 stops acquiring the abnormality flag from the hydraulic pressure sensor 25.

When it is determined in S413 that the hydraulic pressure sensor 25 does not return to the normal state, that is, when it is determined that the state in which the sensor information acquisition unit 301 acquires the abnormality flag from the hydraulic pressure sensor 25 continues (for a time shorter than a predetermined time), it is necessary to continuously monitor normality/abnormality of the hydraulic pressure sensor 25. Therefore, in this case, the process returns to S406, and the processes after S406 are executed again.

However, when it is determined in S413 that the hydraulic pressure sensor 25 returns to the normal state, it is necessary to update the target current value based on the latest output value of the hydraulic pressure sensor 25 in the normal state.

Therefore, in this case, the process proceeds to S414. In S414, the actuator control unit 302 applies, to the EPB motor 10, the target current value based on the present sensor information (the output value of the hydraulic pressure sensor 25) acquired by the sensor information acquisition unit 301, and drives the EPB motor 10.

Then, in S415, the actuator control unit 302 monitors the current value of the EPB motor 10 and determines whether or not the current value exceeds the target current value set in S414.

When it is determined in S415 that the current value of the EPB motor 10 does not exceed the target current value, it can be determined that the pushing of the piston 19 by the linearly moving member 18 is not yet sufficient. Therefore, in this case, the EPB motor 10 continues driving, and the process returns to S414.

Further, when it is determined in S415 that the current value of the EPB motor 10 exceeds the target current value, it can be determined that the pushing of the piston 19 by the linearly moving member 18 is already sufficient. Therefore, in this case, the process proceeds to S404. In S404, the actuator control unit 302 stops the EPB motor 10. Then, the process ends.

As such, in the processing flow shown in FIG. 4, there are three types of route. A first route is a route which reaches S404 immediately before the process ends when Yes is determined in S401 and in which Yes is determined in S408, and then, Yes is determined in S413. A second route is a route in which Yes is determined in S408, and immediately after that, Yes is determined in S410. A third route is a route in which No is determined in S408, and then, Yes is determined in S410 or S413.

Hereinafter, the temporal change in the current value of the EPB motor 10 assumed in each of the first to third routes will be described more specifically with reference to the drawings.

Figure 5:
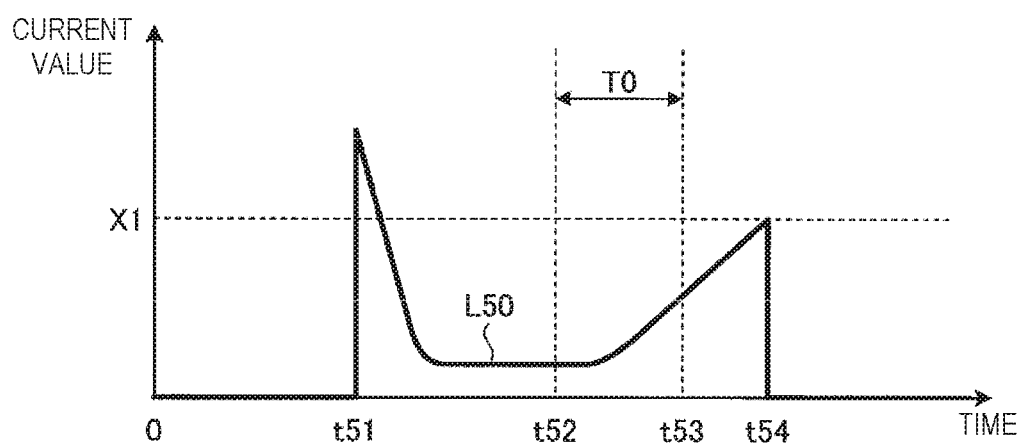
FIG. 5 is an exemplary diagram showing an example of a temporal change in a current value of an EPB motor that can be realized in the embodiment.

FIG. 5 is an exemplary diagram showing an example of the temporal change in the current value of the EPB motor 10 that can be realized in the embodiment. The example shown in FIG. 5 corresponds to the first route described above. That is, the example shown in FIG. 5 corresponds to a situation in which it is determined (Yes in S408) that there is no need to adjust the driving speed of the EPB motor 10 when an abnormality of the hydraulic pressure sensor 25 is detected (Yes in S401), and it is determined that the hydraulic pressure sensor 25 is actually normal (Yes in S413).

In the example shown in FIG. 5, the driving of the EPB motor 10 starts at timing t51, and accordingly, an inrush current is generated in the EPB motor 10 (refer to L50). Then, after the inrush current ends, the current value of the EPB motor 10 is maintained at a substantially constant value (so-called no-load current value) until the linearly moving member 18 comes into contact with the piston 19 (refer to L50).

Further, in the example shown in FIG. 5, an abnormality flag of the hydraulic pressure sensor 25 is acquired at timing t52. However, until timing t53 when a predetermined time T0 elapses from the timing t52, normality/abnormality of the hydraulic pressure sensor 25 cannot be definitely determined. Therefore, in the example shown in FIG. 5, from the timing t52 to the timing t53, a target current value X1 based on the output value of the hydraulic pressure sensor 25 before the timing t52 is set, and the EPB motor 10 is continuously driven.

Further, in the example shown in FIG. 5, when the linearly moving member 18 comes into contact with the piston 19 as the EPB motor 10 is driven, accordingly, the load on the EPB motor 10 increases, and the current value of the EPB motor 10 increases toward the target current value X1 (refer to L50).

Further, in the example shown in FIG. 5, it is determined at the timing t53 that the hydraulic pressure sensor 25 is actually in a normal state.

Here, in the example shown in FIG. 5, the degree of increase in the current value of the EPB motor 10 before the timing t53 is not so large as to reach the target current value X1 before the timing t53 (refer to L50). In this case, it can be determined that there is no need to perform an adjustment that reduces the driving speed of the EPB motor 10 and blunts the degree of increase in the current value of the EPB motor 10. Therefore, in the example shown in FIG. 5, after the timing t53, the target current value X1 based on the output value of the hydraulic pressure sensor 25 after the timing t53 is set, and the EPB motor 10 is continuously driven.

Further, in the example shown in FIG. 5, at timing t54, the current value of the EPB motor 10 reaches the target current value X1, and the EPB motor 10 stops (refer to L50). In this way, the current value of the EPB motor 10 becomes zero and the braking force is locked, so that an appropriate braking force without excess or deficiency corresponding to the target current value X1 is ensured.

Figure 6:
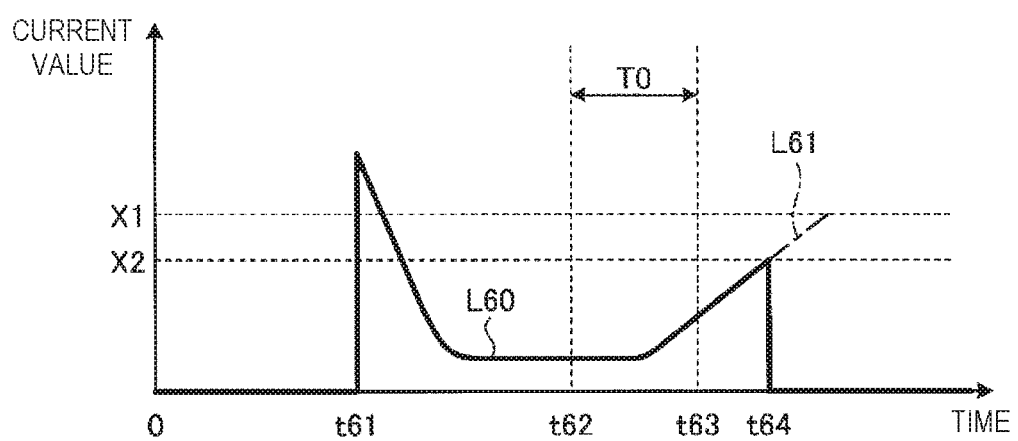
FIG. 6 is an exemplary diagram of an example different from FIG. 5, showing the temporal change in the current value of the EPB motor that can be realized in the embodiment.

FIG. 6 is an exemplary diagram of an example different from FIG. 5, showing the temporal change in the current value of the EPB motor 10 that can be realized in the embodiment. The example shown in FIG. 6 corresponds to the second route described above. That is, the example shown in FIG. 6 corresponds to a situation in which it is determined (Yes in S408) that there is no need to adjust the driving speed of the EPB motor 10 when an abnormality of the hydraulic pressure sensor 25 is detected (Yes in S401), and it is determined that the abnormality of the hydraulic pressure sensor 25 is confirmed (Yes in S410).

In the example shown in FIG. 6, the driving of the EPB motor 10 starts at timing t61, and accordingly, an inrush current is generated in the EPB motor 10 (refer to L60). Then, at timing t62, an abnormality flag of the hydraulic pressure sensor 25 is acquired.

Also in the example shown in FIG. 6, until timing t63 when the predetermined time T0 elapses from the timing t62, normality/abnormality of the hydraulic pressure sensor 25 cannot be definitely determined, as in the example shown in FIG. 5. Therefore, in the example shown in FIG. 6, from the timing t62 to the timing t63, the target current value X1 similar to that in the example shown in FIG. 5 based on the output value of the hydraulic pressure sensor 25 before the timing t62 is set, and the EPB motor 10 is continuously driven (refer to L61).

Further, in the example shown in FIG. 6, at the timing t63, it is determined that the abnormality of the hydraulic pressure sensor 25 is confirmed.

Here, also in the example shown in FIG. 6, the degree of increase in the current value of the EPB motor 10 before the timing t63 is not so large as to reach the target current value X1 before the timing t63 (refer to L60), as in the example shown in FIG. 5. Therefore, also in the example shown in FIG. 6, adjustment on the driving speed of the EPB motor 10 is not performed, as in the example shown in FIG. 5.

However, in the example shown in FIG. 6, the abnormality of the hydraulic pressure sensor 25 is confirmed, unlike the example shown in FIG. 5. Therefore, after the timing t63, a target current value X2, corresponding to an abnormality situation, smaller than the target current value X1 set before the timing t63 is set (refer to L60).

Further, in the example shown in FIG. 6, at timing t64, the current value of the EPB motor 10 reaches the target current value X2, and the EPB motor 10 stops (refer to L60). In this way, the current value of the EPB motor 10 becomes zero and the braking force is locked, so that the braking force corresponding to the target current value X2, that is, the minimum braking force determined by laws and regulations is ensured.

Figure 7:
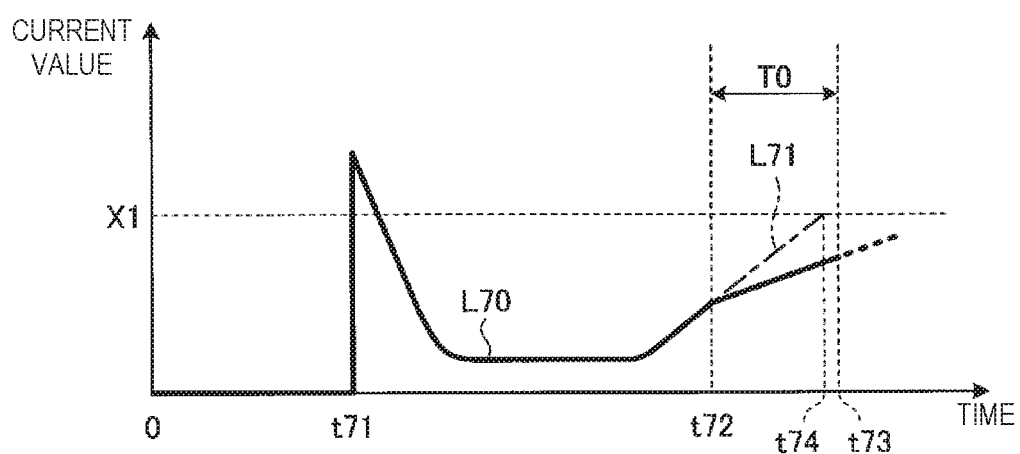
FIG. 7 is an exemplary diagram of an example different from FIGS. 5 and 6, showing the temporal change in the current value of the EPB motor that can be realized in the embodiment.

FIG. 7 is an exemplary diagram of an example different from FIGS. 5 and 6, showing the temporal change in the current value of the EPB motor 10 that can be realized in the embodiment. The example shown in FIG. 7 corresponds to the third route described above. That is, the example shown in FIG. 7 corresponds to a situation in which it is determined (No in S408) that it is necessary to adjust the driving speed of the EPB motor 10 when an abnormality of the hydraulic pressure sensor 25 is detected (Yes in S401).

In the example shown in FIG. 7, the driving of the EPB motor 10 starts at timing t71, and accordingly, an inrush current is generated in the EPB motor 10 (refer to L70). Then, at timing t72, an abnormality flag of the hydraulic pressure sensor 25 is acquired.

Also in the example shown in FIG. 7, until timing t73 when the predetermined time T0 elapses from the timing t72, normality/abnormality of the hydraulic pressure sensor 25 cannot be definitely determined, as in the example shown in FIG. 5. Therefore, in the example shown in FIG. 7, from the timing t72 to the timing t73, the target current value X1 similar to those in the examples shown in FIGS. 5 and 6 based on the output value of the hydraulic pressure sensor 25 before the timing t72 is set, and the EPB motor 10 is continuously driven (refer to L70).

Here, in the example shown in FIG. 7, when the degree of increase in the current value of the EPB motor 10 is maintained as it is, the current value of the EPB motor 10 reaches the target current value X1 at timing t74 before the timing t73 at which determination result on normality/abnormality of the hydraulic pressure sensor 25 is confirmed (refer to L71). Therefore, in the example shown in FIG. 7, in order to adjust the degree of increase in the current value of the EPB motor 10 so that the timing at which the current value of the EPB motor 10 reaches the target current value X1 is delayed after the timing t73, the driving speed of the EPB motor 10 is reduced (refer to L70).

Further, in the example shown in FIG. 7, at the timing t73, determination result on normality/abnormality of the hydraulic pressure sensor 25 is confirmed. Meanwhile, in the example shown in FIG. 7, the temporal change in the current value of the EPB motor 10 after the timing t73 is not shown. However, after the timing t73, the target current value (X1, or X2 shown in FIG. 6) corresponding to the determination result on normality/abnormality of the hydraulic pressure sensor 25 is set.

As described above, the brake control device 300 according to the embodiment includes the sensor information acquisition unit 301 as an example of an abnormality detection unit for detecting an abnormality of the hydraulic pressure sensor 25, and the actuator control unit 302 for newly setting a target current value to be applied to the EPB motor 10 based on the output value of the hydraulic pressure sensor 25 before an abnormality is detected when an abnormality is detected at the time of operation of the EPB motor 10. In this way, even when an abnormality occurs in the hydraulic pressure sensor 25 at the time of operation of the electric parking brake 2, the target current value can be appropriately set on the basis of the past output value of the normal hydraulic pressure sensor 25. As a result, an appropriate braking force without excess or deficiency can be obtained even when an abnormality occurs in the hydraulic pressure sensor 25 at the time of operation of the electric parking brake 2.

Further, in the brake control device 300 according to the embodiment, the actuator control unit 302 determines that an abnormality of the hydraulic pressure sensor 25 is definitely generated when the state in which an abnormality is detected by the sensor information acquisition unit 301 continues for a predetermined time, and adjusts the driving speed of the EPB motor 10 so that the current value of the EPB motor 10 reaches the target current value after a predetermined time elapses since an abnormality is detected when an abnormality is detected at the time of operation of the EPB motor 10. In this way, there is no case that the current value of the EPB motor 10 reaches the target current value before the determination result on the abnormality of the hydraulic pressure sensor 25 is confirmed, and an inappropriate braking force is generated in the vehicle 100.

Further, in the brake control device 300 according to the embodiment, the actuator control unit 302 calculates an estimated value of the time required for the current value of the EPB motor 10 to reach the target current value, and reduces the driving speed of the EPB motor 10 when the estimated value is shorter than a predetermined time. In this way, based on the comparison result between the estimated value and the predetermined time, it is possible to easily determine the necessity of reducing the driving speed.

Further, in the brake control device 300 according to the embodiment, the actuator control unit 302 reduces the driving speed of the EPB motor 10 as the difference between the current value of the EPB motor 10 and the target current value is smaller at the time when an abnormality of the hydraulic pressure sensor 25 is detected. In this way, it is possible to easily and reliably avoid that the current value of the EPB motor 10 reaches the target current value before the determination result on abnormality of the hydraulic pressure sensor 25 is confirmed.

Hereinafter, several modifications assumed in the embodiment will be briefly described.

In the above-described embodiment, the example in which the target current value to be applied to the EPB motor 10 is determined on the basis of the output value of the hydraulic pressure sensor 25 for detecting hydraulic pressure in the master cylinder 5 has been described. However, information to be taken into account for determining the target current value is not limited to information representing the hydraulic pressure in the master cylinder 5. For example, the information to be taken into account for determining the target current value may be information other than the output value of the hydraulic pressure sensor 25, such as information representing the degree of operation of the service brake 1 (depressing force on the brake pedal) by a driver, so long as it correlates with hydraulic pressure in the wheel cylinder 6.

Further, in the above-described embodiment, the example in which, by reducing the driving speed (rotational speed) of the EPB motor 10, the current value of the EPB motor 10 is prevented from reaching the target current value before the determination result on normality/abnormality of the hydraulic pressure sensor 25 is confirmed has been described. However, as another example, in the case where the current value of the EPB motor 10 is likely to reach the target current value before the determination result on normality/abnormality of the hydraulic pressure sensor 25 is confirmed, a configuration is also conceivable in which the EPB motor 10 is temporarily stopped until the determination result is confirmed. Even with this configuration, it is possible to prevent the current value of the EPB motor 10 from reaching the target current value before the determination result on normality/abnormality of the hydraulic pressure sensor 25 is confirmed, similarly to the configuration of reducing the driving speed of the EPB motor 10.

Furthermore, in the above-described embodiment, the example in which the operation level of the EPB motor 10 is controlled by controlling the target current value to be applied to the EPB motor 10, and as a result, the pressing force (target pressing force) to be applied to the brake pad 11 by the piston 19 is controlled has been described. However, in the embodiment, as a method of controlling the operation level of the EPB motor 10, a method other than the method of controlling the target current value to be applied to the EPB motor 10 may be used, so long as it can control the pressing force to be applied to the brake pad 11 by the piston 19.

Although the embodiments of the invention and modifications thereof have been described above, the above-described embodiments and modifications are merely examples and are not intended to limit the scope of the invention. The above-described novel embodiments and modifications can be implemented in various forms, and various omissions, replacements and changes can be made without departing from the scope of the invention. Further, the above-described embodiments and modifications are included in the scope and gist of the invention and are included in the invention described in the claims and the equivalents thereof.

The invention claimed is:

1. A brake control device for controlling an electric parking brake provided with a piston that is capable of pressing a brake pad in accordance with the hydraulic pressure in a cylinder, a linearly moving member that adjusts, by reciprocating in the cylinder, a pressing force applied to the brake pad by the piston, and an actuator that moves the linearly moving member by operating on the basis of a target pressing force, which is a target value of the pressing force corresponding to an output value obtained from a sensor that detects information correlating with the hydraulic pressure, the brake control device comprising:
   an abnormality detection unit that detects an abnormality of the sensor; and
   an actuator control unit that, if the abnormality is detected, controls the operation level of the actuator on the basis of the output value prior to the detection of the abnormality,
   wherein the actuator control unit 1) determines that the abnormality occurs when the state in which the abnormality is detected continues for a predetermined time, and 2) controls the operation level of the actuator so that, if the abnormality is detected, the pressing force applied to the brake pad by the piston reaches the target pressing force after the predetermined time elapses since the abnormality is detected.

2. The brake control device according to claim 1, wherein the actuator control unit calculates an estimated value of the time required for the pressing force applied to the brake pad by the piston to reach the target pressing force and reduces the operation level when the estimated value is shorter than the predetermined time.

3. The brake control device according to claim 2, wherein the actuator control unit greatly reduces the operation level as the difference between the pressing force applied to the brake pad by the piston and the target pressing force at the time when the abnormality is detected is smaller.

* * * * *